US012793883B2

(12) United States Patent
Okuzawa et al.

(10) Patent No.: US 12,793,883 B2
(45) Date of Patent: Nov. 10, 2026

(54) MULTILAYER COIL COMPONENT

(71) Applicant: TDK CORPORATION, Tokyo (JP)

(72) Inventors: Nobuyuki Okuzawa, Tokyo (JP); Kazuya Tobita, Tokyo (JP); Munehiro Takaku, Tokyo (JP); Teruhiro Mitsuyasu, Tokyo (JP)

(73) Assignee: TDK CORPORATION, Tokyo (JP)

( * ) Notice: Subject to any disclaimer, the term of this patent is extended or adjusted under 35 U.S.C. 154(b) by 843 days.

(21) Appl. No.: 17/969,339

(22) Filed: Oct. 19, 2022

(65) Prior Publication Data

US 2023/0207182 A1 Jun. 29, 2023

(30) Foreign Application Priority Data

Dec. 28, 2021 (JP) ................................ 2021-214294

(51) Int. Cl.

| | |
|---|---|
| ***H01F 5/00*** | (2006.01) |
| ***H01F 27/02*** | (2006.01) |
| ***H01F 27/28*** | (2006.01) |
| ***H01F 27/29*** | (2006.01) |
| ***H01F 27/32*** | (2006.01) |

(52) U.S. Cl.

CPC ....... *H01F 27/2823* (2013.01); *H01F 27/022* (2013.01); *H01F 27/292* (2013.01); *H01F 27/327* (2013.01)

(58) Field of Classification Search

CPC .................................................. H01F 27/2823
USPC ......................................................... 336/200
See application file for complete search history.

(56) References Cited

U.S. PATENT DOCUMENTS

| | | | | |
|---|---|---|---|---|
| 10,840,009 | B2 * | 11/2020 | Kido | H01F 27/292 |
| 2002/0009577 | A1 * | 1/2002 | Takaya | H03H 7/0115 428/209 |
| 2004/0183645 | A1 * | 9/2004 | Takaya | H01F 41/041 336/234 |
| 2014/0145815 | A1 * | 5/2014 | Ishii | H01F 27/292 336/200 |
| 2017/0278811 | A1 * | 9/2017 | Suga | H01L 25/162 |
| 2017/0345558 | A1 * | 11/2017 | Sekiguchi | H01F 27/29 |
| 2018/0096778 | A1 * | 4/2018 | Yatabe | H01G 4/30 |
| 2018/0096780 | A1 * | 4/2018 | Sekiguchi | H01F 27/2804 |

FOREIGN PATENT DOCUMENTS

| | | |
|---|---|---|
| JP | 2003-218626 A | 7/2003 |
| JP | 2015-141945 A | 8/2015 |
| WO | 2016/059918 A1 | 4/2016 |

OTHER PUBLICATIONS

English translation of JP2003197427 (Year: 2003).*
Jun. 30, 2026 Office Action issued in Chinese Application No. 202211285568.3.

* cited by examiner

*Primary Examiner* — Ronald Hinson
(74) *Attorney, Agent, or Firm* — Oliff PLC

(57) ABSTRACT

A multilayer coil component includes an element body including a main surface (a mounting surface) and a main surface, a pair of terminal electrodes disposed on the main surface of the element body, and a coil that is disposed in the element body and electrically connected to the pair of terminal electrodes, wherein the element body includes at least one element body layer containing a filler and at least one element body layer having a lower dielectric constant than the element body layer between a first wiring portion and the terminal electrodes.

6 Claims, 2 Drawing Sheets

MULTILAYER COIL COMPONENT

TECHNICAL FIELD

The present invention relates to a multilayer coil component.

BACKGROUND

As a conventional multilayer coil component, for example, a multilayer coil component described in Patent Document 1 (Japanese Unexamined Patent Publication No. 2015-141945) is known. The multilayer coil component described in Patent Document 1 includes an element body made of a resin, a coil disposed in the element body, and a pair of terminal electrodes disposed on a mounting surface of the element body.

SUMMARY

In the multilayer coil component, in order to reduce stray capacitance formed between the terminal electrodes and the coil and to improve a Q characteristic in a high frequency range, the element body is made of a material with a low dielectric constant. However, if the element body is made of a material with a low dielectric constant, there is a risk that a strength of the element body cannot be ensured.

An object of one aspect of the present invention is to provide a multilayer coil component of which characteristics can be improved while a strength of an element body thereof can be ensured.

A multilayer coil component according to one aspect of the present invention includes: an element body including a mounting surface and a main surface facing the mounting surface; a pair of terminal electrodes disposed on the mounting surface of the element body; and a coil that is disposed in the element body and electrically connected to the pair of terminal electrodes, wherein the coil includes a first wiring portion disposed on the main surface side, a second wiring portion disposed on the mounting surface side, and a connection portion that extends in a direction in which the mounting surface and the main surface face each other and connects the first wiring portion to the second wiring portion, and the element body is configured to include at least one first resin layer containing a filler and at least one second resin layer having a lower dielectric constant than the first resin layer between the first wiring portion and the terminal electrodes.

In the multilayer coil component according to the one aspect of the present invention, the element body is configured to include at least one first resin layer containing a filler and at least one second resin layer having a lower dielectric constant than the first resin layer between the first wiring portion and the terminal electrodes. In the multilayer coil component, since the element body includes the first resin layer containing a filler, a strength of the element body can be ensured. In addition, in the multilayer coil component, since the element body includes the second resin layer having a lower dielectric constant than the first resin layer, stray capacitance formed between the terminal electrodes and the coil can be lowered. For that reason, the multilayer coil component can inhibit a decrease in self-resonant frequency. Accordingly, the multilayer coil component can improve a Q characteristic in a high frequency range. In this way, in the multilayer coil component, it is possible to improve characteristics while ensuring the strength of the element body.

In one embodiment, the main surface may be configured of the first resin layer. With this configuration, a strength of the main surface of the element body can be ensured.

In one embodiment, a thickness of the first resin layer in the direction in which the mounting surface and the main surface face each other may be smaller than a thickness of the second resin layer. With this configuration, since the thickness of the second resin layer having a lower dielectric constant is larger in the element body (the second resin layer occupies a large proportion of the element body), the stray capacitance formed between the terminal electrodes and the coil can be lowered.

In one embodiment, a plurality of first resin layers and a plurality of second resin layers may be alternately disposed in the element body. With this configuration, it is possible to improve the characteristics while ensuring the strength of the element body.

According to one aspect of the present invention, it is possible to improve the characteristics while ensuring the strength of the element body.

DETAILED DESCRIPTION

Figure 1:
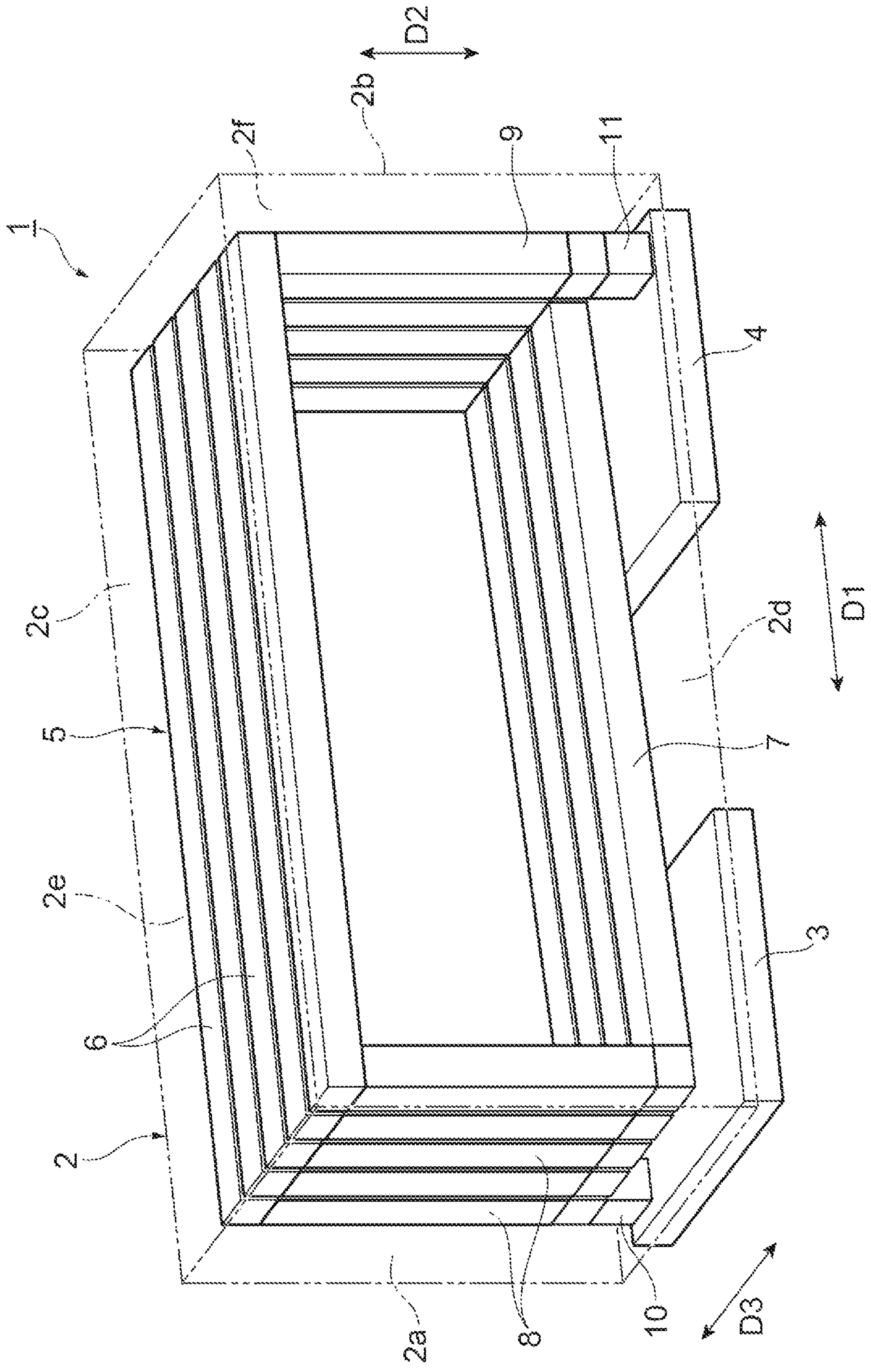
FIG. 1 is a perspective view of a multilayer coil component according to an embodiment.

A preferred embodiment of the present invention will be described in detail below with reference to the accompanying drawings. Also, in the description of the drawings, the same or corresponding elements will be denoted by the same reference numerals, and repeated description will be omitted.

A multilayer coil component according to the present embodiment will be described with reference to FIG. 1. FIG. 1 is a perspective view of a multilayer coil component according to one embodiment. As shown in FIG. 1, a multilayer coil component 1 includes an element body 2, a first terminal electrode 3, a second terminal electrode 4, a coil 5, a first connection portion 10, and a second connection portion 11. In FIG. 1, the element body 2 is indicated by a two-dot chain line for convenience of description.

The element body 2 has a rectangular parallelepiped shape. Rectangular parallelepiped shapes include a rectangular parallelepiped shape with chamfered corners and edges, and a rectangular parallelepiped shape with rounded corners and edges. The element body 2 has, as outer surfaces, a pair of end faces 2*a* and 2*b*, a pair of main surfaces 2*c* and 2*d*, and a pair of side surfaces 2*e* and 2*f*. The end faces 2*a* and 2*b* face each other. The main surfaces 2*c* and 2*d* face each other. The side surfaces 2*e* and 2*f* face each other. Hereinafter, a direction in which the end faces 2*a* and 2*b* face each other is defined as a first direction D1, a direction in which the main surfaces 2*c* and 2*d* face each other is defined as a second direction D2, and a direction in which the side surfaces 2*e* and 2*f* face each other is defined as a third direction D3. The first direction D1, the second direction D2, and the third direction D3 are substantially orthogonal to each other.

The end faces 2*a* and 2*b* extend in the second direction D2 to connect the main surfaces 2*c* and 2*d* to each other. The end faces 2*a* and 2*b* also extend in the third direction D3 to connect the side surfaces 2*e* and 2*f* to each other. The main surfaces 2*c* and 2*d* extend in the first direction D1 to connect the end faces 2*a* and 2*b* to each other. The main surfaces 2*c* and 2*d* also extend in the third direction D3 to connect the side surfaces 2*e* and 2*f* to each other. The side surfaces 2*e* and 2*f* extend in the first direction D1 to connect the end faces 2*a* and 2*b* to each other. The side surfaces 2*e* and 2*f* also extend in the second direction D2 to connect the main surfaces 2*c* and 2*d* to each other.

The main surface 2*d* is a mounting surface and is a surface that faces another electronic device (for example, a circuit board or a laminated electronic component), for example, when the multilayer coil component 1 is mounted on another electronic device. The end faces 2*a* and 2*b* are surfaces continuously connected from the mounting surface (that is, the main surface 2*d*).

A length of the element body 2 in the first direction D1 is longer than a length of the element body 2 in the second direction D2 and a length of the element body 2 in the third direction D3. The length of the element body 2 in the second direction D2 is shorter than the length of the element body 2 in the third direction D3. That is, in the present embodiment, the end faces 2*a* and 2*b*, the main surfaces 2*c* and 2*d*, and the side surfaces 2*e* and 2*f* are rectangular. The length of the element body 2 in the second direction D2 may be equal to the length of the element body 2 in the third direction D3, or may be longer than the length of the element body 2 in the third direction D3.

Also, in the present embodiment, in addition to being equal, the term "equal" may also include a case in which values are equal including a slight difference or a manufacturing error within a preset range. For example, when a plurality of values fall within ±5% of the mean of the plurality of values, the plurality of values are defined as being equal.

The element body 2 is formed by laminating a plurality of element body layers (first resin layers and second resin layers) L1 to L15 (see FIG. 2) in the second direction D2. That is, a laminating direction of the element body 2 is the second direction D2. A specific lamination structure of the element body 2 will be described later. In the actual element body 2, the plurality of element body layers L1 to L15 may be integrated to the extent that boundaries between the layers are invisible, or may be integrated such that the boundaries between the layers are visible.

Each of the first terminal electrode 3 and the second terminal electrode 4 is provided on the element body 2. Each of the first terminal electrode 3 and the second terminal electrode 4 is disposed on the main surface 2*d* of the element body 2. The first terminal electrode 3 and the second terminal electrode 4 are provided on the element body 2 to be separated from each other in the first direction D1. Specifically, the first terminal electrode 3 is disposed on the end face 2*a* side of the element body 2. The second terminal electrode 4 is disposed on the end face 2*b* side of the element body 2.

Figure 2:
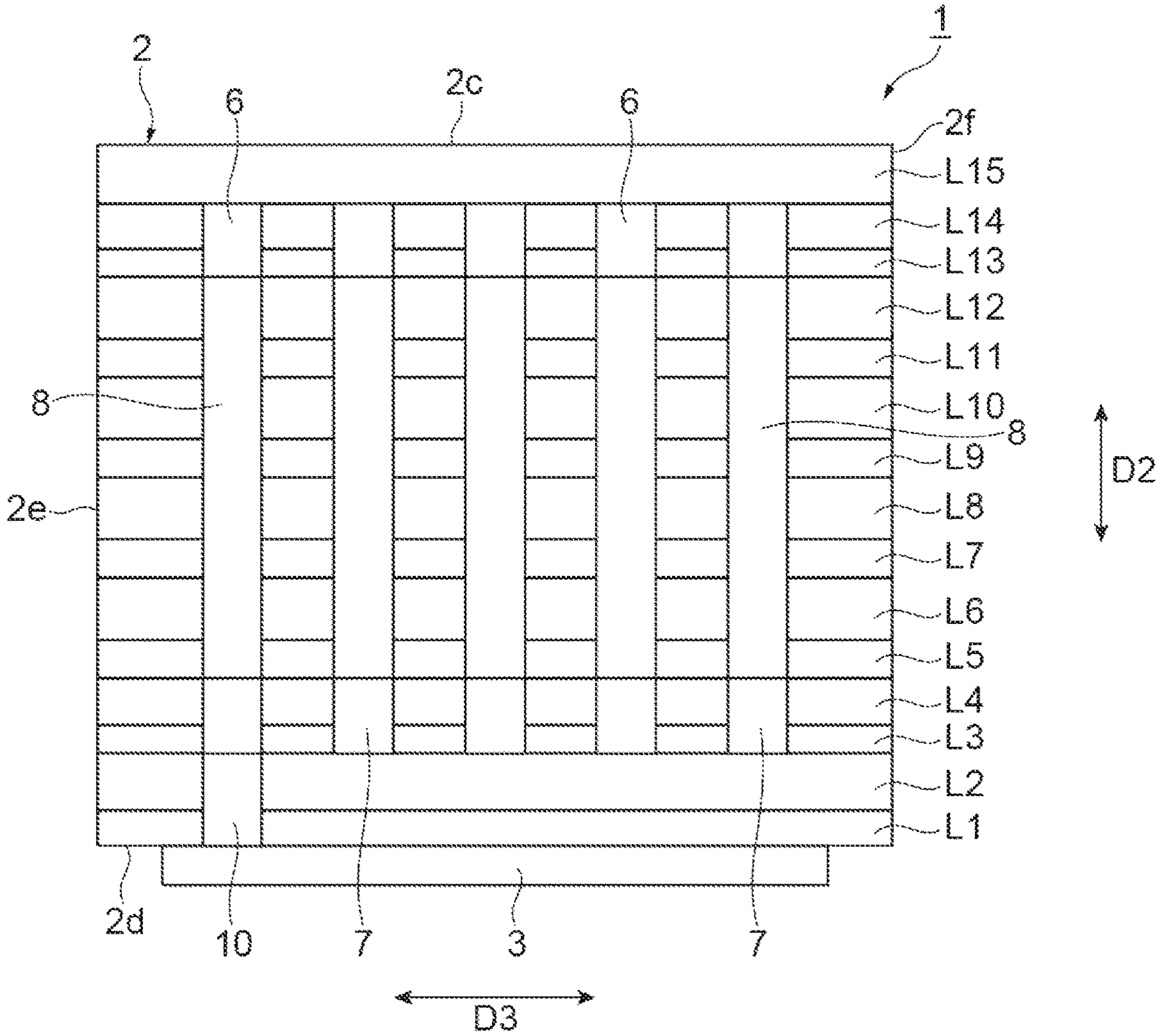
FIG. 2 is a diagram showing a cross-sectional configuration of the multilayer coil component.

Each of the first terminal electrode 3 and the second terminal electrode 4 has a rectangular shape (a quadrangular shape). Each of the first terminal electrode 3 and the second terminal electrode 4 is disposed such that each side thereof extends in the first direction D1 or the third direction D3. As shown in FIG. 2, the first terminal electrode 3 and the second terminal electrode 4 protrude from the main surface 2*d*. That is, in the present embodiment, respective surfaces of the first terminal electrode 3 and the second terminal electrode 4 are not flush with the main surface 2*d*. The first terminal electrode 3 and the second terminal electrode 4 are made of a conductive material (for example, Cu).

Each of the first terminal electrode 3 and the second terminal electrode 4 may be provided with a plated layer (not shown) containing, for example, Ni, Sn, Au, or the like by electrolytic plating or electroless plating. The plated layer may have, for example, a Ni-plated film that contains Ni and covers the first terminal electrode 3 and the second terminal electrode 4, and a Au plating film that contains Au and covers the Ni-plated film.

The coil 5 is disposed inside the element body 2. The coil 5 has a plurality of first wiring portions 6, a plurality of second wiring portions 7, a plurality of first pillar portions (connection portions) 8, and a plurality of second pillar portions (connection portions) 9. The coil 5 is configured by electrically connecting the first wiring portions 6, the second wiring portions 7, the first pillar portions 8 and the second pillar portions 9. A coil axis of the coil 5 is provided in the third direction D3. The plurality of first wiring portions 6, the plurality of second wiring portions 7, the plurality of first pillar portions 8, and the plurality of second pillar portions 9 are made of a conductive material (for example, Cu). The first wiring portions 6, the second wiring portions 7, the first pillar portions 8, and the second pillar portions 9 are disposed apart from the end faces 2*a* and 2*b*, the main surfaces 2*c* and 2*d*, and the side surfaces 2*e* and 2*f*.

Each of the first wiring portions 6 is disposed on the main surface 2*c* side of the element body 2. Each of the first wiring portions 6 extends in the first direction D1. Each of the first wiring portions 6 connects the first pillar portions 8 to the second pillar portions 9. The first wiring portions 6 span between the first pillar portions 8 and the second pillar portions 9. One end portions of the first wiring portions 6 in an extending direction thereof (end portions on the end face 2*a* side) are connected to one end portions of the first pillar portions 8 (end portions on the main surface 2*c* side). The other end portions of the first wiring portions 6 in the extending direction (end portions on the end face 2*b* side) are connected to one end portions of the second pillar portions 9.

Each of the second wiring portions 7 is disposed on the main surface 2*d* (mounting surface) side of the element body 2. Each of the second wiring portions 7 extends in the first direction D1. Each of the second wiring portions 7 connects the first pillar portions 8 to the second pillar portions 9. The second wiring portions 7 span between the first pillar portions 8 and the second pillar portions 9. One end portions of the second wiring portions 7 in an extending direction thereof (end portions on the end face 2*a* side) are connected to the other end portions of the first pillar portions 8 (end portions on the main surface 2*d* side). The other end portions of the second wiring portions 7 in the extending direction (end portions on the end face 2*b* side) are connected to the other end portions of the second pillar portions 9. The number of the plurality of second wiring portions 7 is one less than that of the plurality of first wiring portions 6. That is, in a case in which the number of the first wiring portions 6 is n, the number of the second wiring portions 7 is n−1.

Each of the first pillar portions 8 is disposed on the end face 2*a* side of the element body 2. Each of the first pillar portions 8 extends in the second direction D2. The first pillar portions 8 connect the first wiring portions 6 to the second wiring portions 7. One end portions of the first pillar portions 8 are connected to one end portions of the first wiring portions 6. The other end portions of the first pillar portions 8 are connected to one end portions of the second wiring portions 7.

Each of the second pillar portions 9 is disposed on the end face 2*b* side of the element body 2. The second pillar portions 9 connect the first wiring portions 6 to the second wiring portions 7. One end portions of the second pillar portions 9 are connected to the other end portions of the first wiring portions 6. The other end portions of the second pillar portions 9 are connected to the other end portions of the second wiring portions 7.

The first connection portion 10 connects the first terminal electrode 3 to one end portion of the coil 5. The first connection portion 10 is connected to the other end portion of the first pillar portions 8 of the coil 5. The first connection portion 10 is made of a conductive material (for example, Cu).

The second connection portion 11 connects the second terminal electrode 4 to the other end portion of the coil 5. The second connection portion 11 is connected to the other end portion of the second pillar portions 9 of the coil 5. The second connection portion 11 is made of a conductive material (for example, Cu).

FIG. 2 is a diagram showing a cross-sectional configuration of the multilayer coil component 1. FIG. 2 shows a cross-section of the multilayer coil component 1 in a plane in the second direction D2 and the third direction D3. In FIG. 2, illustration of hatching is omitted. As shown in FIG. 2, in the element body 2, the element body layers L1 to L15 are laminated in order from the main surface 2*d* toward the main surface 2*c* in the second direction D2. An outer surface of the element body layer L1 constitutes the main surface 2*d* of the element body 2. An outer surface of the element body layer L15 constitutes the main surface 2*c* of the element body 2.

The element body layers L1 to L15 are resin layers. Materials of the element body layers L1 to L15 include at least one selected from, for example, a liquid crystal polymer, a polyimide resin, a crystalline polystyrene, an epoxy-based resin, an acrylic resin, a bismaleimide-based resin, and a fluorine-based resin.

The element body layers L1, L3, L5, L7, L9, L11, L13, and L15 are resin layers (first resin layers) containing fillers. The fillers are, for example, inorganic fillers. Examples of inorganic fillers include silica. Dielectric constants of the element body layers L1, L3, L5, L7, L9, L11, L13, and L15 are greater than 3.

The element body layers L2, L4, L6, L8, L10, L12, and L14 are resin layers (second resin layers) containing no filler. The element body layers L2, L4, L6, L8, L10, L12, and L14 have lower dielectric constants than the element body layers L1, L3, L5, L7, L9, L11, L13, and L15. In other words, the element body layers L1, L3, L5, L7, L9, L11, L13, and L15 have higher dielectric constants than the element body layers L2, L4, L6, L8, L10, L12, and L14. It can be said that the element body layers L2, L4, L6, L8, L10, L12, and L14 are low dielectric constant resin layers. The dielectric constants of the element body layers L2, L4, L6, L8, L10, L12, and L14 are, for example, 3 or less.

In the element body 2, at least one resin layer containing a filler and at least one resin layer containing no filler are disposed between the first wiring portions 6, the first terminal electrode 3, and the second terminal electrode 4. In the element body 2 of the present embodiment, resin layers containing fillers and resin layers containing no filler are alternately disposed (laminated) between the first wiring portions 6, the first terminal electrode 3, and the second terminal electrode 4. Specifically, in the element body 2, the element body layers L1, L3, L5, L7, L9, and L11 and the element body layers L2, L4, L6, L8, L10, and L12 are alternately disposed between the first wiring portions 6, the first terminal electrode 3, and the second terminal electrode 4.

Thicknesses of the element body layers L1, L3, L5, L7, L9, and L11 in the second direction D2 are smaller (thinner) than thicknesses of the element body layers L2, L4, L6, L8, L10, and L12 in the second direction D2 between the first wiring portions 6, the first terminal electrode 3, and the second terminal electrode 4. In other words, the thicknesses of the element body layers L2, L4, L6, L8, L10, and L12 in the second direction D2 are greater (thicker) than the thicknesses of the element body layers L1, L3, L5, L7, L9, and L11 in the second direction D2. In the element body 2, a total thickness of the element body layers L2, L4, L6, L8, L10, L12, and L14 is greater than a total thickness of the element body layers L1, L3, L5, L7, L9, L11, L13, and L15. That is, in the element body 2, proportions (volumes) of the element body layers L2, L4, L6, L8, L10, L12, and L14 are larger than proportions of the element body layers L1, L3, L5, L7, L9, L11, L13, and L15.

The multilayer coil component 1 can be manufactured, for example, as follows. The element body layers L1 to L15 can be formed by laminating sheets that form the resin layers. The coil 5 (the first wiring portions 6, the second wiring portions 7, the first pillar portions 8, and the second pillar portions 9), the first connection portion 10, and the second connection portion 11 can be manufactured using a photolithography method. The "photolithography method" is not limited to a type of mask or the like as long as a processing target layer including a photosensitive material is exposed and developed, thereby being processed into a desired pattern.

As described above, in the multilayer coil component 1 according to the present embodiment, the element body 2 is configured to include the element body layers L1, L3, L5, L7, L9, L11, L13, and L15 containing fillers and the element body layers L2, L4, L6, L8, L10, L12, and L14 having lower dielectric constants than the element body layers L1, L3, L5, L7, L9, L11, L13, and L15 between the first wiring portions 6, the first terminal electrode 3, and the second terminal electrode 4. In the multilayer coil component 1, since the element body 2 includes the element body layers L1, L3, L5, L7, L9, L11, L13, and L15, a strength of the element body 2 can be ensured. Moreover, in the multilayer coil component 1, since the element body 2 includes the element body layers L2, L4, L6, L8, L10, L12, and L14, stray capacitance formed between the first terminal electrode 3, the second terminal electrode 4, and the coil 5 can be lowered. For that reason, in the multilayer coil component 1, a decrease in self-resonant frequency can be inhibited. Accordingly, in the multilayer coil component 1, a Q characteristic in a high frequency range may be further improved.

In the multilayer coil component 1 according to the present embodiment, the main surface 2*c* of the element body 2 is configured of the element body layer L15 containing a filler. With this configuration, a strength of the main surface 2*c* of the element body 2 can be ensured. The main surface 2*c* of the element body 2 is a surface that is exposed when the multilayer coil component 1 is mounted on an electronic device or the like. For that reason, by securing the strength of the main surface 2*c* of the element body 2, it is possible to inhibit occurrence of defects such as breakage (cracks) in the multilayer coil component 1.

In the multilayer coil component 1 according to the present embodiment, the thicknesses of the element body layers L1, L3, L5, L7, L9, and L11 in the second direction D2 are smaller (thinner) than the thicknesses of the element body layers L2, L4, L6, L8, L10, and L12 in the second direction D2 between the first wiring portions 6, the first terminal electrode 3, and the second terminal electrode 4. In this configuration, since the element body layers L2, L4, L6, L8, L10, and L12 having lower dielectric constants have larger thicknesses in the element body 2 (a proportion the element body layers L2, L4, L6, L8, L10, and L12 occupy in the element body 2 increases), the stray capacitance formed between the first terminal electrode 3, the second terminal electrode 4, and the coil 5 can be lowered.

In the multilayer coil component 1 according to the present embodiment, the element body layers L1, L3, L5, L7, L9, L11, L13, and L15 and the element body layers L2, L4, L6, L8, L10, L12, L14 are alternately disposed in the element body 2. With this configuration, it is possible to improve the characteristics while ensuring the strength of the element body 2.

Although the embodiment of the present invention has been described above, the present invention is not necessarily limited to the above-described embodiment, and various modifications can be made without departing from the scope of the invention.

In the above embodiment, a form in which the first terminal electrode 3 and the second terminal electrode 4 protrude from the main surface 2*d* has been described as an example. However, the first terminal electrode 3 and the second terminal electrode 4 may be embedded within the element body 2. That is, the first terminal electrode 3 and the second terminal electrode 4 may be provided to be substantially flush with the main surface 2*d*. In this configuration, the plated layers provided on each of the first terminal electrode 3 and the second terminal electrode 4 may protrude from the main surface 2*d*.

In the above embodiment, a form in which the element body layer L1 of the element body 2 that forms the main surface 2*d* (mounting surface) is a resin layer containing a filler has been described as an example. However, the main surface 2*d* of the element body 2 may be configured of a resin layer containing no filler.

In the above embodiment, a form in which the element body layers L1, L3, L5, L7, L9, L11, L13, and L15 containing a filler and the element body layers L2, L4, L6, L8, L10, L12, and L14 containing no filler are alternately disposed has been described as an example. However, the element body 2 may have at least one first resin layer containing a filler and at least one second resin layer containing no filler between the first terminal electrode 3, the second terminal electrode 4, and the first wiring portions 6.

In the above embodiment, the configuration of the coil 5 is not limited to the forms shown in FIGS. 1 and 2.

What is claimed is:

1. A multilayer coil component comprising:

an element body including a mounting surface and a main surface facing the mounting surface;

a pair of terminal electrodes disposed only on the mounting surface of the element body; and a coil that is disposed in the element body and electrically connected to the pair of terminal electrodes, wherein the coil includes a first wiring portion, a second wiring portion, and a connection portion that extends in a direction in which the mounting surface and the main surface face each other and connects the first wiring portion to the second wiring portion, the first wiring portion being disposed between the main surface and the second wiring portion in the direction in which the mounting surface and the main surface face each other, the second wiring portion being disposed between the first wiring portion and the mounting surface in the direction in which the mounting surface and the main surface face each other, the element body is configured to include at least one first resin layer containing a filler and at least one second resin layer having a lower dielectric constant than the first resin layer between the first wiring portion and the terminal electrodes, when viewed in the direction in which the mounting surface and the main surface face each other, the first wiring portion extends continuously between the pair of terminal electrodes and overlaps both of the pair of terminal electrodes, and the second wiring portion extends continuously between the pair of terminal electrodes and overlaps both of the pair of terminal electrodes, and one of the terminal electrodes and the connection portion overlap when viewed from the direction in which the mounting surface and the main surface face each other.

2. The multilayer coil component according to claim 1, wherein the main surface is configured of the first resin layer.

3. The multilayer coil component according to claim 1, wherein a thickness of the first resin layer in the direction in which the mounting surface and the main surface face each other is smaller than a thickness of the second resin layer.

4. The multilayer coil component according to claim 1, wherein a plurality of first resin layers and a plurality of second resin layers are alternately disposed in the element body.

5. The multilayer coil component according to claim 1, wherein the at least one second resin layer contains no filler.

6. The multilayer coil component according to claim 1, wherein the terminal electrodes and the second wiring portion overlap when viewed from the direction in which the main surface and the mounting surface face each other.

* * * * *